(12) United States Patent
Ho

(10) Patent No.: US 6,176,625 B1
(45) Date of Patent: Jan. 23, 2001

(54) CAMERA AND A METHOD OF LOADING A CAMERA

(76) Inventor: Nai Yin Todd Ho, Block B, 19/F., 43 Wong Nei Chung Road, Happy Valley (HK)

(*) Notice: Under 35 U.S.C. 154(b), the term of this patent shall be extended for 0 days.

(21) Appl. No.: 09/249,174

(22) Filed: Feb. 12, 1999

(51) Int. Cl.[7] ................................................. G03B 1/00
(52) U.S. Cl. ......................................... 396/411; 396/413
(58) Field of Search ................................... 396/387, 411, 396/413

(56) References Cited

U.S. PATENT DOCUMENTS

| 5,452,033 | 9/1995 | Balling et al. . |
| 5,453,808 | * 9/1995 | Zawodny et al. ..................... 396/413 |
| 5,576,789 | 11/1996 | Patton . |
| 5,689,733 | 11/1997 | Zawodny et al. . |
| 5,758,198 | 5/1998 | Watkins et al. . |
| 5,778,269 | * 7/1998 | Williams ............................... 396/413 |

FOREIGN PATENT DOCUMENTS

| 0750214 | 12/1996 | (EP) . |
| 557664 | 11/1943 | (GB) . |
| 563884 | 9/1944 | (GB) . |
| 708506 | 5/1954 | (GB) . |

* cited by examiner

*Primary Examiner*—David M. Gray
(74) *Attorney, Agent, or Firm*—Samuels, Gauthier & Stevens

(57) ABSTRACT

A camera (2) has a film-cassette chamber (12) for receiving a film cassette (13) having a spool therein on which film is wound and a film receiving chamber (14), the camera further comprises a film advance wheel (30) including means (32) for engaging the film cassette (13) to allow film to be wound into the cassette, a rotatable spool (16) disposed in the film receiving chamber (14) to which a leading end of the film can be attached, a film pre-wind wheel (54) connected to the spool (16), at least a portion of said pre-wind wheel (54) being accessible externally of the camera by a user, and means such as a ratchet (58) for selectively ensuring unidirectional rotation of the film advance wheel during film advance after each exposure which are selectively disengageable to allow free rotation of the film advance wheel during a film pre-wind operation.

18 Claims, 11 Drawing Sheets

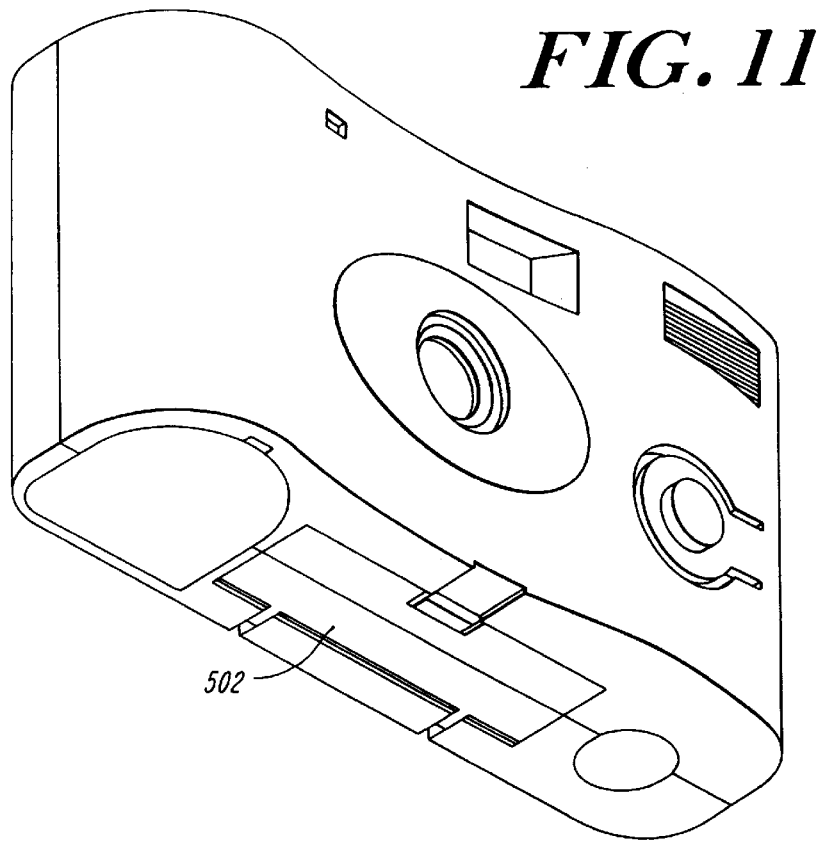
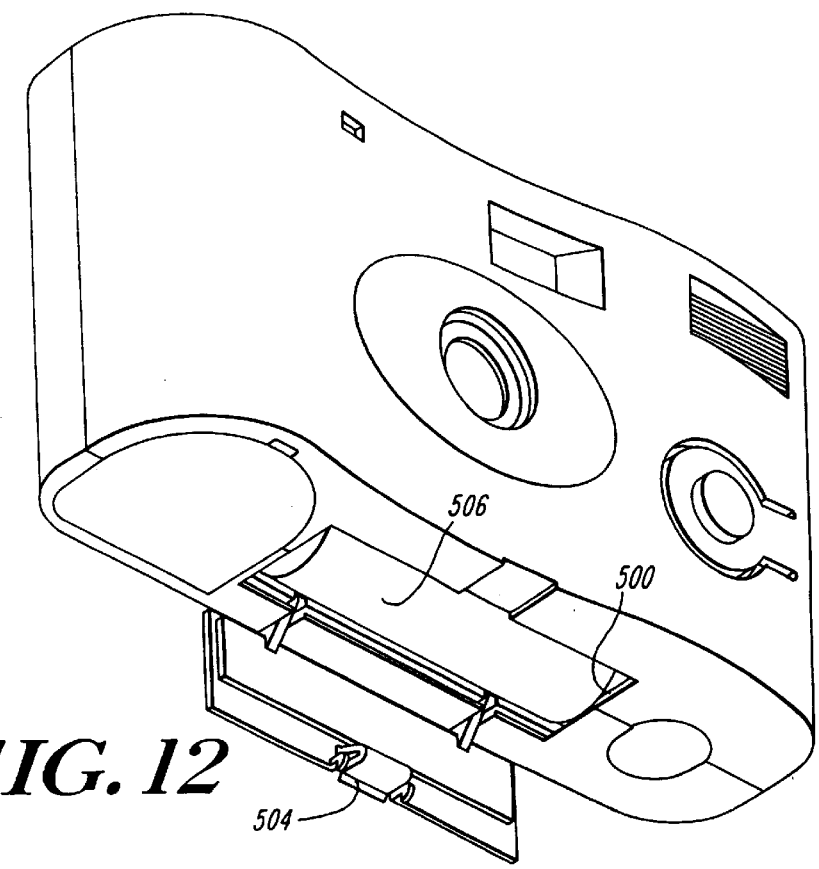

CAMERA AND A METHOD OF LOADING A CAMERA

BACKGROUND OF THE INVENTION

The present invention relates to a camera, and to a method of loading a camera.

In recent years cameras known variously as disposable or single-use cameras, or referred to by some as lens-fitted photographic film packages, have become increasingly popular. These are cameras of simple construction which are pre-loaded with film by the manufacturer. Once the user finishes the film, the user returns the entire camera to the photolab for developing of the film. The manufacturer may then either discard the camera in its entirety, or subject to appropriate checks that the camera is still functional, re-load the camera. Alternatively the manufacturer may re-use specific components of the camera.

As the awareness of problems of environmental contamination increases, as well as for economic reasons, consumers are less willing to tolerate disposable products. There consequently exists a need for a very simple and cheap camera and yet which can be re-used at least several times by a user.

SUMMARY OF THE INVENTION

According to a first aspect of the invention there is provided a camera having a film-cassette chamber for receiving a film cassette having a spool therein on which film is wound and a film receiving chamber, the camera further comprising a film advance wheel including means for engaging the film cassette to allow film to be wound into the cassette; a rotatable spool disposed in said film receiving chamber to which a leading end of the film can be attached; a film pre-wind wheel connected to the spool, at least a portion of said pre-wind wheel being accessible externally of the camera by a user; and means for selectively ensuring unidirectional rotation of the film advance wheel during film advance after each exposure, said means being selectively disengageable to allow free rotation of the film advance wheel.

The ability to disengage the film advance wheel allows the user to withdraw the film from the cassette themselves, and thereby reload the camera.

Preferably, the camera further comprises means for selectively engaging means on said rotatable film take-up spool to ensure unidirectional rotation of said spool during a film pre-wind operation. This assists the user in the pre-wind operation, ensuring the film is wound on to the spool in the right direction, and does not loosen if the user stops unwinding the film.

In a preferred embodiment the means for selectively ensuring unidirectional rotation of the film advance wheel comprises a ratchet pawl selectively movable into engagement with the film advance wheel. The ratchet pawl is biased in a direction into engagement with said film advance wheel, and movable actuating means are provided to disengage the ratchet pawl from the film advance wheel. The movable actuating means comprise a slidable arm which acts on a portion of said pawl to push it out of engagement with said film advance wheel. The slidable arm is provided with a portion thereof adapted to engage in one or other of a pair of detents which thereby define the engaged and disengaged positions of the slide arm and ratchet pawl.

Preferably, the means to selectively engage said rotatable take-up spool comprise a second ratchet means, and said means on said rotatable film take-up spool comprise the pre-wind wheel which is provided with a plurality of teeth. The second ratchet means includes a springy slide arm movable into engagement with said pre-wind wheel to allow rotation of the wheel in one direction only. The springy slide arm is provided with a portion thereof adapted to engage in one or other of a pair of detents to thereby define the engaged and disengaged positions of the springy slide arm.

The means for selectively engaging means on said rotatable take-up spool may alternatively be operatively connected to said means for selectively ensuring unidirectional rotation of the film advance wheel. This allows the user to effect disengagement/engagement of both film advance and pre-wind wheels by operating a single switch. Preferably, the means for selectively engaging means provided on said rotatable take-up spool comprise a second ratchet pawl, and the means provided on the rotatable take-up spool comprise the pre-wind wheel which is provided with a plurality of teeth. The second ratchet pawl is biased by resilient means into engagement with said further wheel.

The camera preferably includes a removable rear cover which includes a latch to releasably secure the rear cover to the camera. Alternatively, the camera may include a hinged back portion which may be opened to allow for reloading.

The camera may also be of the type adapted for use with film carrying pre-exposed latent images, as for example discussed in U.S. Pat. No. 5,187,512 of Polaroid. In this case, the camera includes masking means for masking a portion of said exposure window.

According to a further aspect the invention resides in a method of loading a film into a camera comprising a film cassette chamber and a film take-up spool housed in a film receiving chamber, a film advance wheel including means for engaging a spool of the film cassette to allow film to be wound into the cassette, a film pre-wind wheel connected to the film take-up spool at least a portion of which is accessible by a user, and means for selectively ensuring unidirectional rotation of the film advance wheel the method involving the steps of: (a) inserting the film cassette into the cassette chamber and attaching a leading end of the film to the film take-up spool; (b) disengaging said means for selectively ensuring unidirectional rotation of the film advance wheel, and engaging the means for selectively ensuring unidirectional rotation of the film take-up spool; and (c) rotating said film pre-wind to unwind the film from said cassette on to said take-up spool.

This method may be carried out by the manufacturer or user, and if carried out economical out in a dark environment it is unnecessary to close the camera back. The method may be carried out by the user on re-loading in which case the method would usually be carried out with the winding occurring after the back of the camera has been fitted.

Preferably, the camera has means for selectively ensuring unidirectional rotation of the film take-up spool, wherein step (b) of the method further involves engaging the means for selectively ensuring unidirectional rotation of the film take-up spool. After step (c), the method preferably requires the step of (d) engaging said means for selectively ensuring unidirectional rotation of the film advance wheel, and disengaging said means for selectively ensuring unidirectional rotation of the film take-up spool.

BRIEF DESCRIPTION OF THE DRAWINGS

Embodiments of the invention are now described by way of example only, with reference to the following drawings in which:

FIG. 11 is a front view of a fifth embodiment of the invention;

FIG. 12 is a front view of the camera of FIG. 11 with a battery door open;

DETAILED DESCRIPTION OF THE PREFERRED EMBODIMENTS

Figure 1:
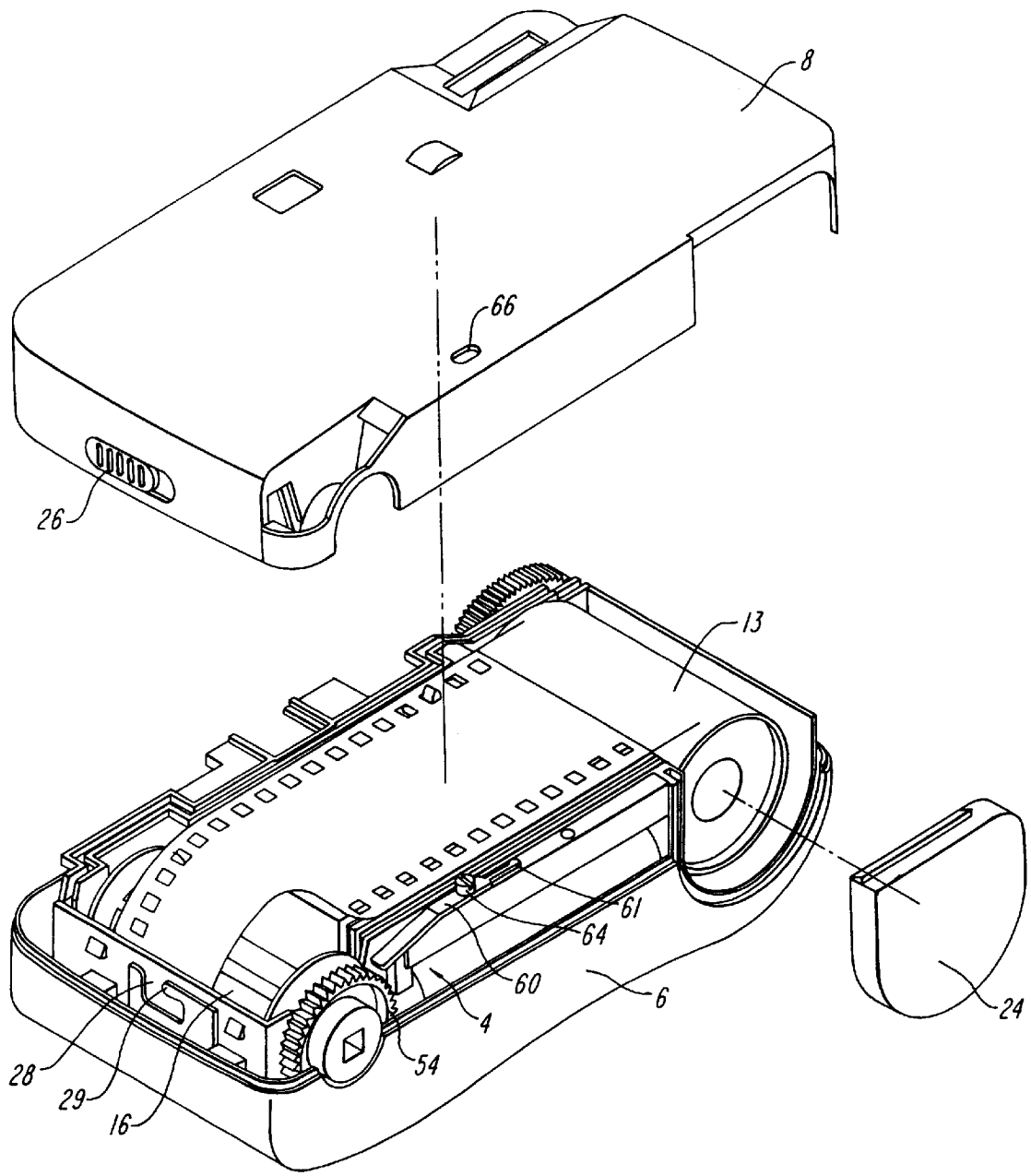
FIG. 1 is a rear view of a camera in accordance with a first embodiment of the invention with a rear cover and cassette chamber cover removed.

The camera, indicated generally by numeral 2, includes a main body part 4 which carries the majority of the operative components of the camera 2, and a front cover part 6 and rear cover part 8 which together enclose the main body 4. The main body 4 supports a lens assembly 10, a front portion of which extends through an aperture in the front cover part 6, and behind which is arranged a shutter assembly as is entirely conventional and well understood by those skilled in the art. The main body 4 defines part of a first film-cassette receiving chamber 12 which receives a film-containing cassette or patrone 13 which is preferably a conventional 35 mm patrone having a central rotatable spool on which the film is wound. Other standard film formats can equally be accommodated with appropriate modification. A second film receiving chamber 14 is arranged at the opposite side of the camera. A film take-up spool 16 is arranged in the chamber 14 on to which the film is wound prior to the camera being ready for use, as is discussed in more detail below. Between the film chambers 12 and 14 is arranged an exposure window 18 located between upper and lower film guides 20, 22 which support the film at its edges as it extends between the film chambers. A film passageway for the film to travel between the film chambers 12 and 14 is defined between the back cover plate 8 and opposed region of the main body 4 and film guides 20, 22. The main body 4, and front and rear cover parts 6, 8 define an opening at the lower end of the film cassette chamber 12, which is closed in use by a removable cover plate 24, allowing removal of the film cassette 13 through the opening once the film has been exposed. As is known in the art, the cover plate 24 and adjacent parts of the main body 4 are provided with appropriate adaptations in the form of co-operating grooves on the cover plate 24 and flanges on the main body 4 which together ensure light-tight closure of the opening.

Figure 3:
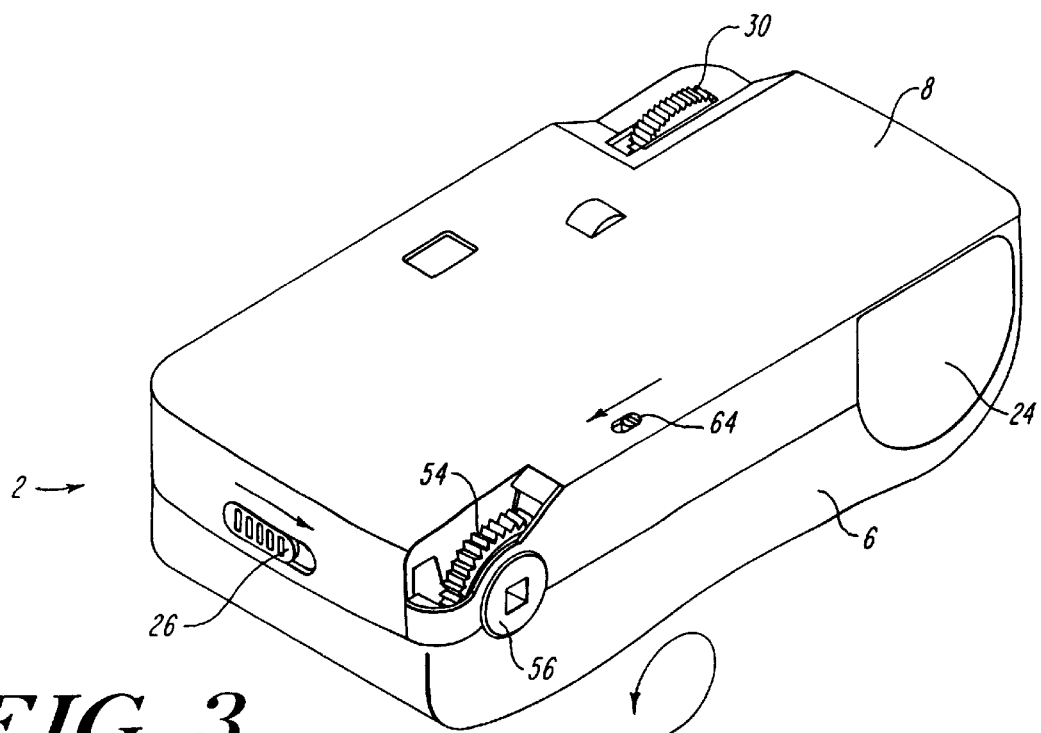
FIG. 3 shows the rear of the camera with rear cover fitted.

The rear cover part 8 is removably fitted to the main body 4. This is achieved by providing at opposite edges a releasable locking means or latch including a finger slide 26 having an inwardly directed movable pin (not visible) on the rear cover 8, movable between an open position as shown in FIG. 1 where the rear cover 8 can be simply push-fitted on to the rear of the main body 4 with the pin extending into the mouth of a recess 28 formed on the main body, and a locking position where the pin engages beneath a lug 29 moulded on the edge of the main body 4. FIG. 3 shows the direction of movement of the slide 26 to achieve locking. It can be arranged that such locking means are provided at both sides of the camera 2 or only one side, in which case some other simple means of engagement at the other side is required such as a lug on one of the main body 4 or rear cover 8 which fits into a recess on the other part. These arrangements allow the user to readily open and close the camera for re-loading films therein.

Figure 6:
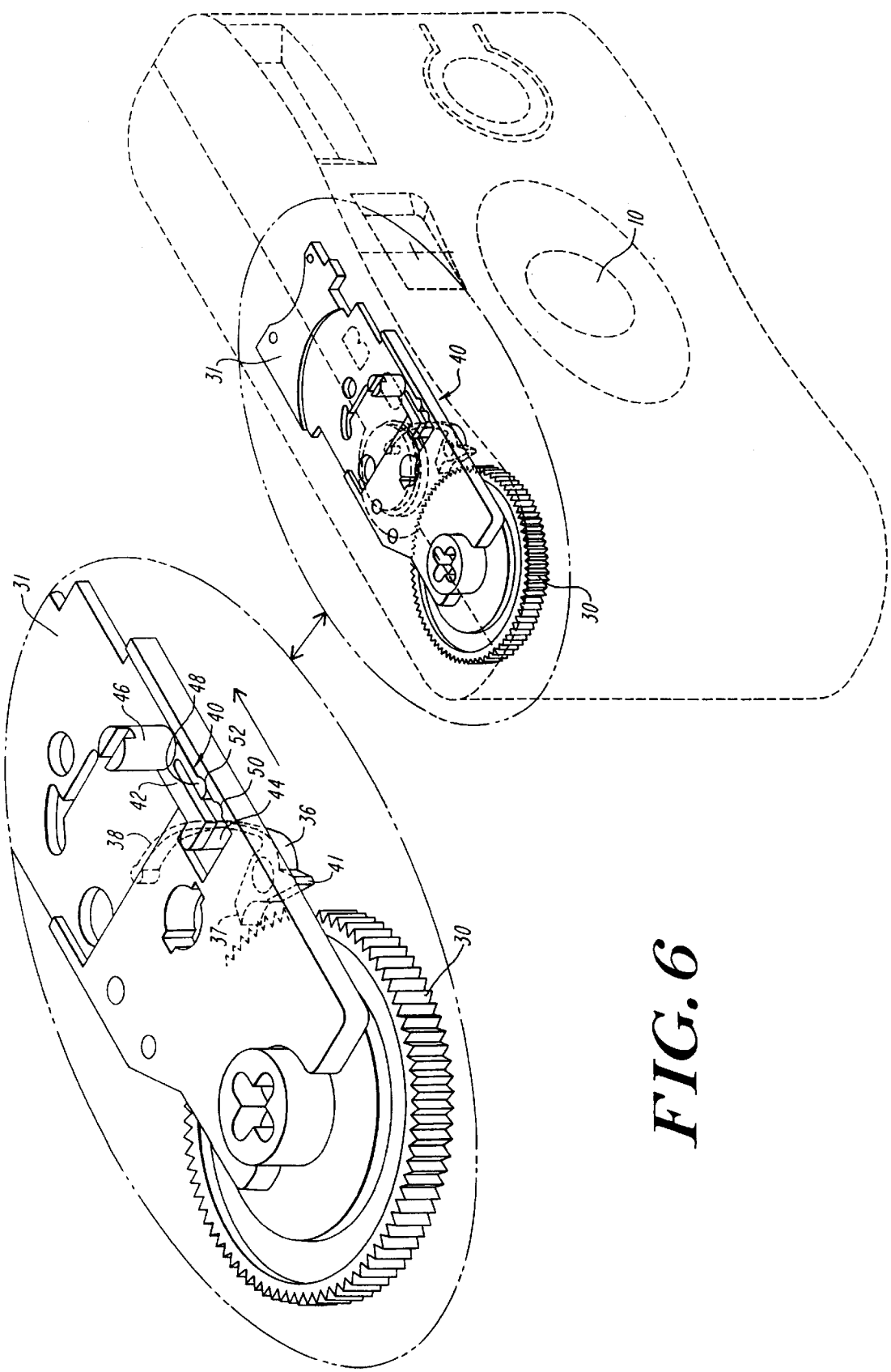
FIG. 6 is a part cut-away view of an upper region of the camera in a pre-wind position.
Figure 7:
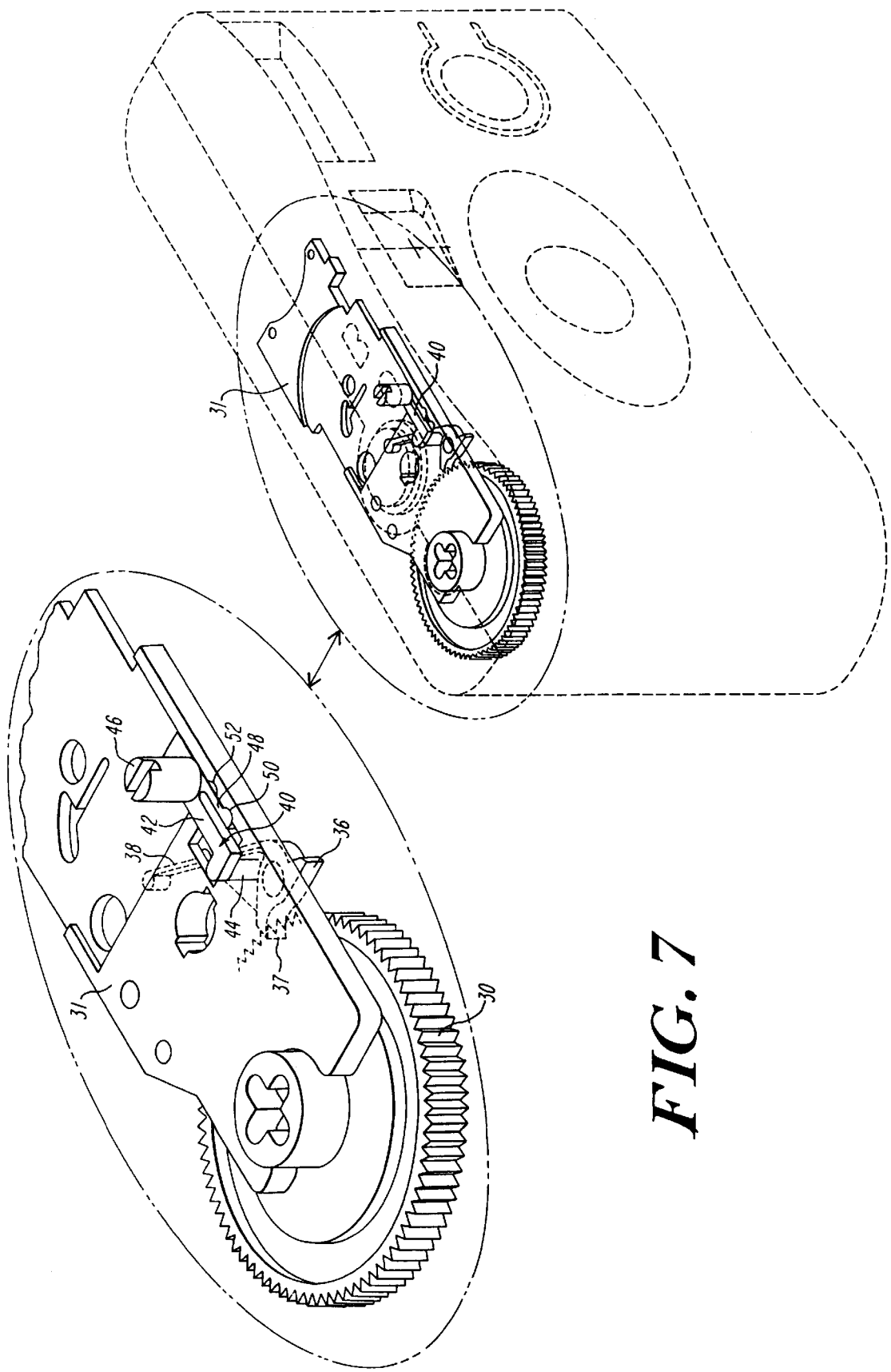
FIG. 7 is a view corresponding to that of FIG. 6 but in a film advance condition.

As is conventional, the camera is provided with a wind-on mechanism best seen in FIGS. 6 and 7 including a rotatable film advance wheel or thumb wheel 30 held on top of the main body 4 beneath a plate 31 having a plurality of teeth, and lower shaped drive shaft 32 which extends into and engages the central spool of a conventional film patrone 13. The mechanism includes a film sprocket wheel 34 located just above the film exposure window 18, and a film counter. The film sprocket wheel 34 is operatively connected to the re-cocking mechanism of the shutter, so that each time the film is wound on one frame by the user (by turning the film advance wheel), the film sprocket wheel is rotated one turn, which brings a lever of the shutter back to its primed position, and in addition prevents further rotation of the film advance wheel 30, as is conventional.

Figure 5:
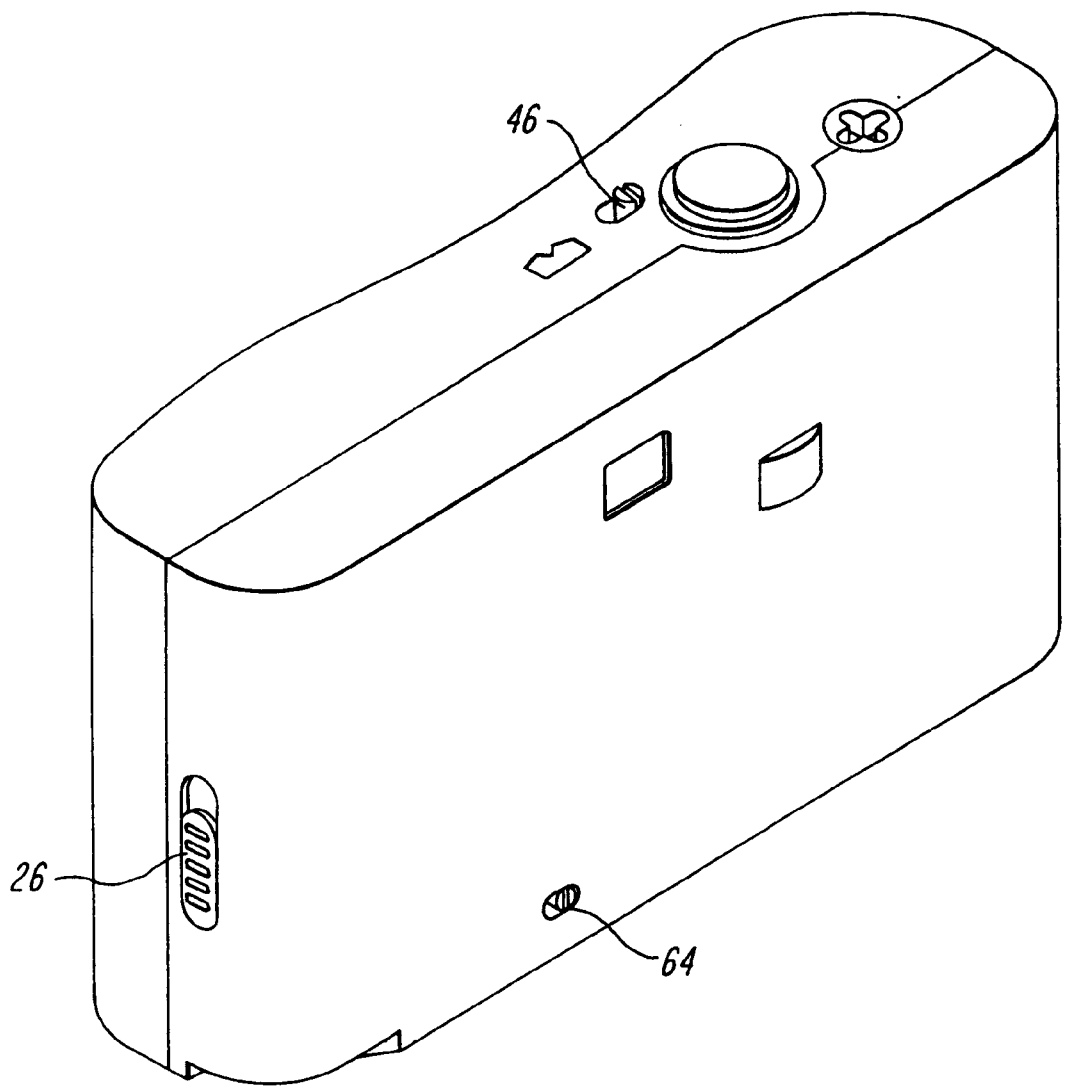
FIG. 5 shows the camera of the first or second embodiments.

The film advance wheel 30 is provided with means to ensure its unidirectional rotation in the form of a ratchet arrangement comprising a ratchet pawl 36 supported on the top plate 31 to allow pivoting movement. The pawl 36 is provided with a biasing leg 38 which serves to bias the pawl 36 in a clockwise sense (when viewed from above as in FIGS. 6 and 7), so that a finger 37 of the pawl engages in the teeth of the film advance wheel 30. A switch 40 is provided which includes an arm 42, downwardly depending finger 44 and upwardly extending knob 46, the switch being mounted in a slot in the top plate 31 to allow restricted sliding movement. In the leftmost position of the switch (FIG. 7) the depending finger 44 is spaced from the leg 38 or lightly touches this, the finger 37 of the pawl 36 being urged into engagement with the knurls of the film advance wheel thereby preventing rotation in the clockwise sense. The switch 40 is movable to the rightmost position (FIG. 6) at which the depending finger 44 engages the biasing leg 38 and urges the pawl 36 to rotate in the anticlockwise sense out of engagement with the film advance wheel 30 thereby allowing its free rotation. The knob 46 extends upwardly through an opening in the front cover 6 (as seen in FIG. 5) and preferably has a groove assisting gripping by the user. The switch 40 is provided with a side arm 48 having enlarged end portions which can snap into detents 50 and 52 thereby defining the two end positions of the switch 40.

At the opposite side of the camera the film take-up spool 16 is provided with a slot having at least one claw to which the user (or manufacturer) can attach a leading end of the film withdrawn from the film cassette 13 in a conventional way. What is not conventional is that the spool 16 is provided with a knurled or toothed pre-wind wheel 54 formed unitarily with or fitted on to the spool 16. When the spool 16 is fitted into the chamber 14 the knurled pre-wind wheel 54 lies outside the chamber 14 on the opposite side of a lower portion 55 of the main body, a portion thereof extending through an aperture in the rear cover 8 so as to be accessible to the user (see FIG. 3). The lower end 56 of the knurled pre-wind wheel 54 also extends outwardly of the cover protruding through an opening defined by the edge region of both the front and rear covers 6 and 8.

Ratchet means 58 are also provided to selectively prevent rotation of the spool 16 in the clockwise sense when viewed from below (ie in the direction of withdrawal of film from the spool). These ratchet means 58 comprise slide arm 60 which is arranged to slide on a lower portion of the main body 4 below the film passage having a bent portion which extends towards and is slidable into engagement with the knurled pre-wind wheel 54. The slide arm 60 is provided on its rear side (not visible) with a knob or screw or other enlarged portion which extends through a slot in the body portion to hold the arm thereon. The opposite end of the slide 60 is provided with a thin springy upwardly-biased finger 61 which has an end portion which can snap into a left or right detent.

The slide 60 is provided with a knob 64 which extends through an opening 66 in the rear cover 8 to allow the user to move the slide 60 from the leftmost locking position where the clockwise (from below) rotation of the wheel 54 is prevented, to the rightmost unlocked position.

Although in this arrangement the pre-wind wheel 54 co-operates with the ratchet, a separate toothed wheel could alternatively be provided on or connected to the spool 16, so that the slide 60 engages this.

Figure 2:
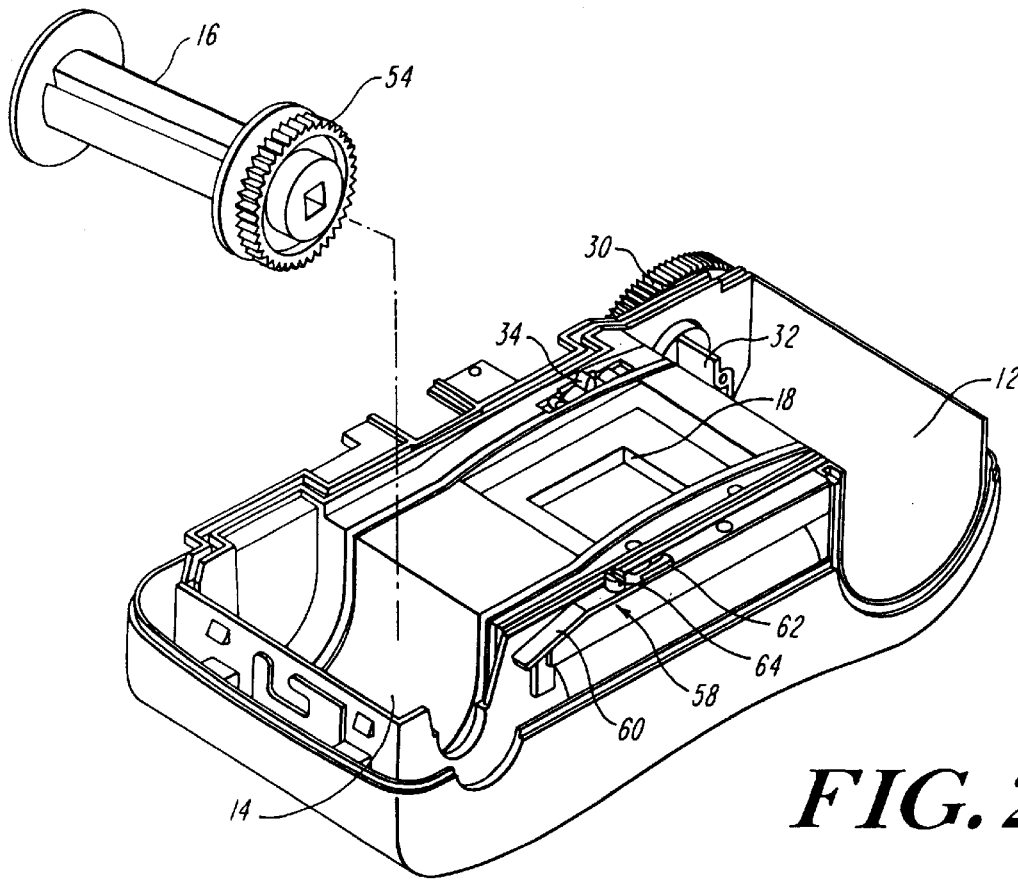
FIG. 2 is a rear view of the camera with rear cover removed showing the insertion of a film take-up spool.

The camera is loaded with film as follows. A film cassette is fitted into the camera by the manufacturer in the instance of first time loading at the factory, or by the user in the case of second or subsequent use, and the leading end of the film withdrawn from the film cassette. The leading end is fitted on to the spool 16 which is preferably already fitted into the chamber 14 by inserting this into the central slot so that a sprocket hole engages over a claw (FIG. 2). Thereafter, the back cover 8 is fitted thereon (FIG. 3). The film advance wheel 30 ratchet is disengaged by moving the knob 46 away from the film advance wheel 30 (that is in the position of FIG. 6), allowing rotation of the cassette spool. The ratchet 58 for the film pre-wind wheel 54 is engaged by moving the knob 64 towards the film pre-wind wheel 54, and the wheel 54 rotated in the anticlockwise sense (from below), to unwind the film from the cassette. Due to the ratchet, the pre-wind wheel 54 may only be turned one way, so that user may not inadvertently wind the film in the wrong direction around the spool. This also ensures that the film does not unwind at all if the user stops winding for a moment, ensuring proper tensioning of the film. Once the end of the film is reached, the ratchet 58 is disengaged by moving the knob 64 to the right ie away from the wheel 54, to allow for the sequential unwinding of film from the spool as pictures are taken. The film advance wheel ratchet is now engaged, to ensure that the film advance wheel may only turn in the anticlockwise sense, and ensuring that the film does not inadvertently unwind from the cassette at any stage during the taking of pictures. Once the end of the film is reached the leading end of the film will disengage from behind the claw on the spool, and the film is wound in its entirety back into the cassette. The user may then remove the lower plate 24 to allow the film to be removed and to be developed in the normal way.

Figure 4:
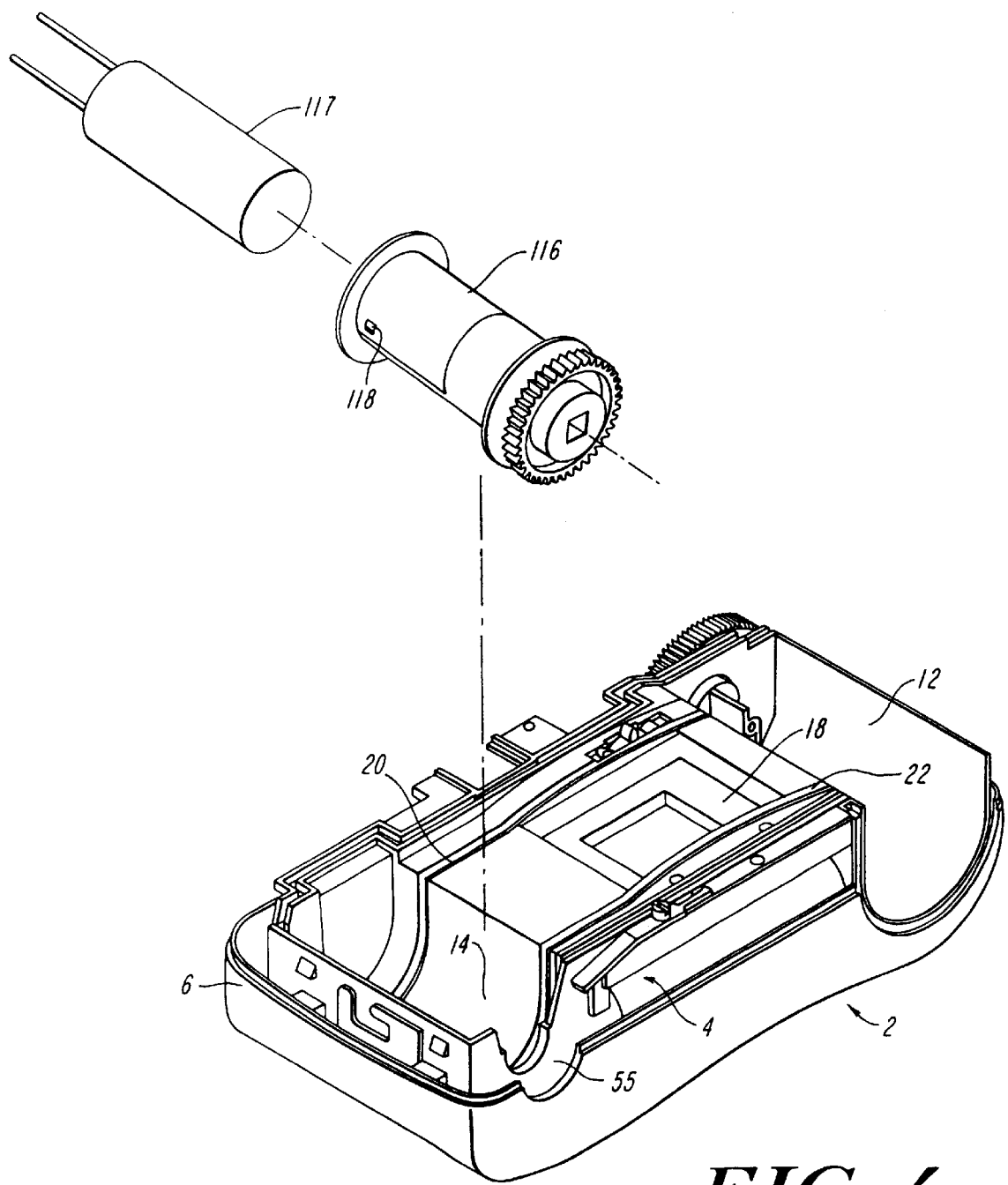
FIG. 4 shows a second embodiment of a camera in accordance with the rear cover removed.

FIG. 4 shows a second embodiment of the camera which is identical to the first embodiment, except that the spool 116 is modified to be in the form of a hollow tube in which a capacitor 117 of the flash unit is arranged. This arrangement of capacitor can be utilized to increase the compactness of the overall camera. The spool 116, instead of being provided with a slot provided with a claw adjacent thereto, has the claw 118 arranged on the outer surface thereof to which the leading end of the film is attached.

Figure 8:
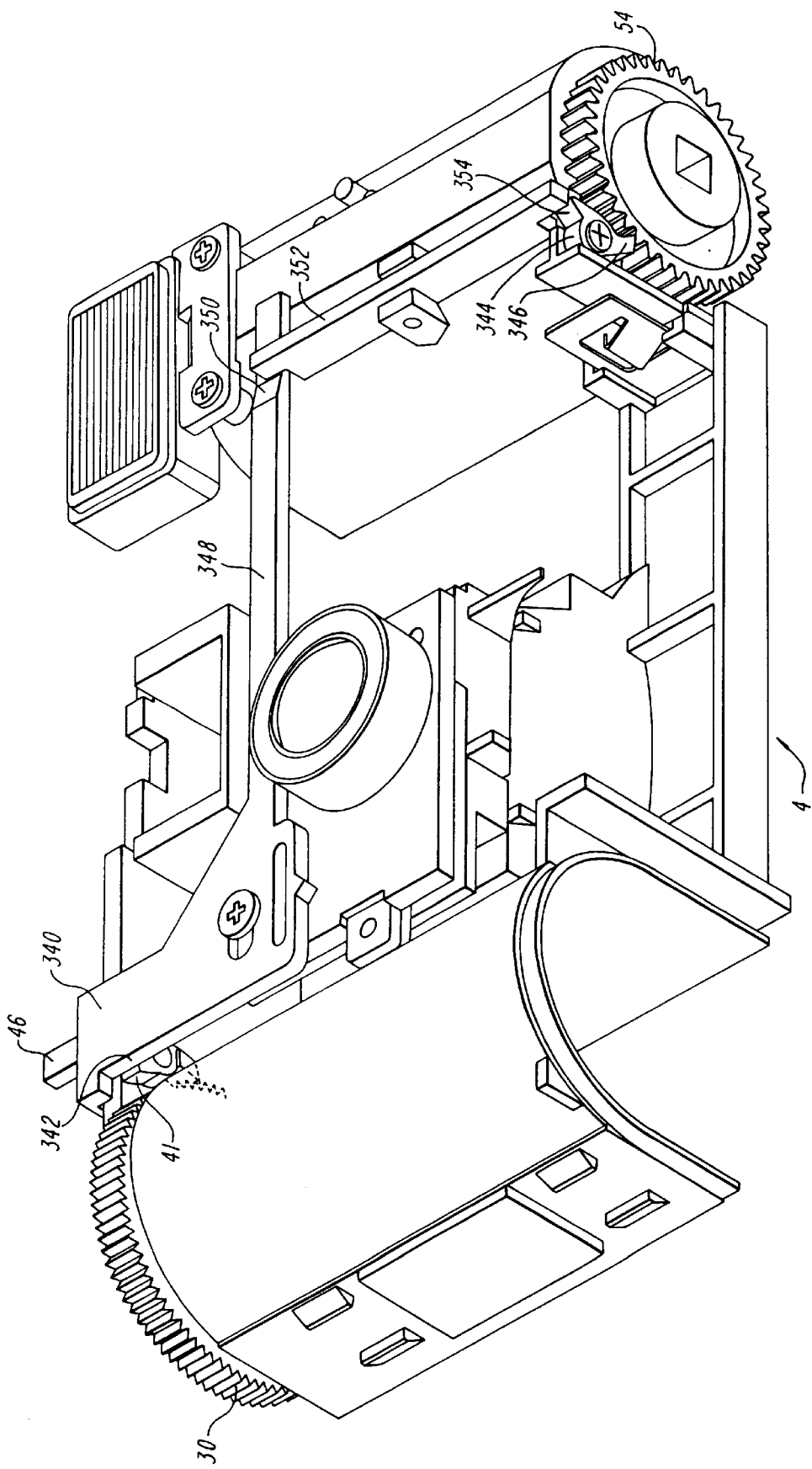
FIG. 8 is a front view of a main body portion of a third embodiment of the invention, in a film pre-wind condition.
Figure 9:
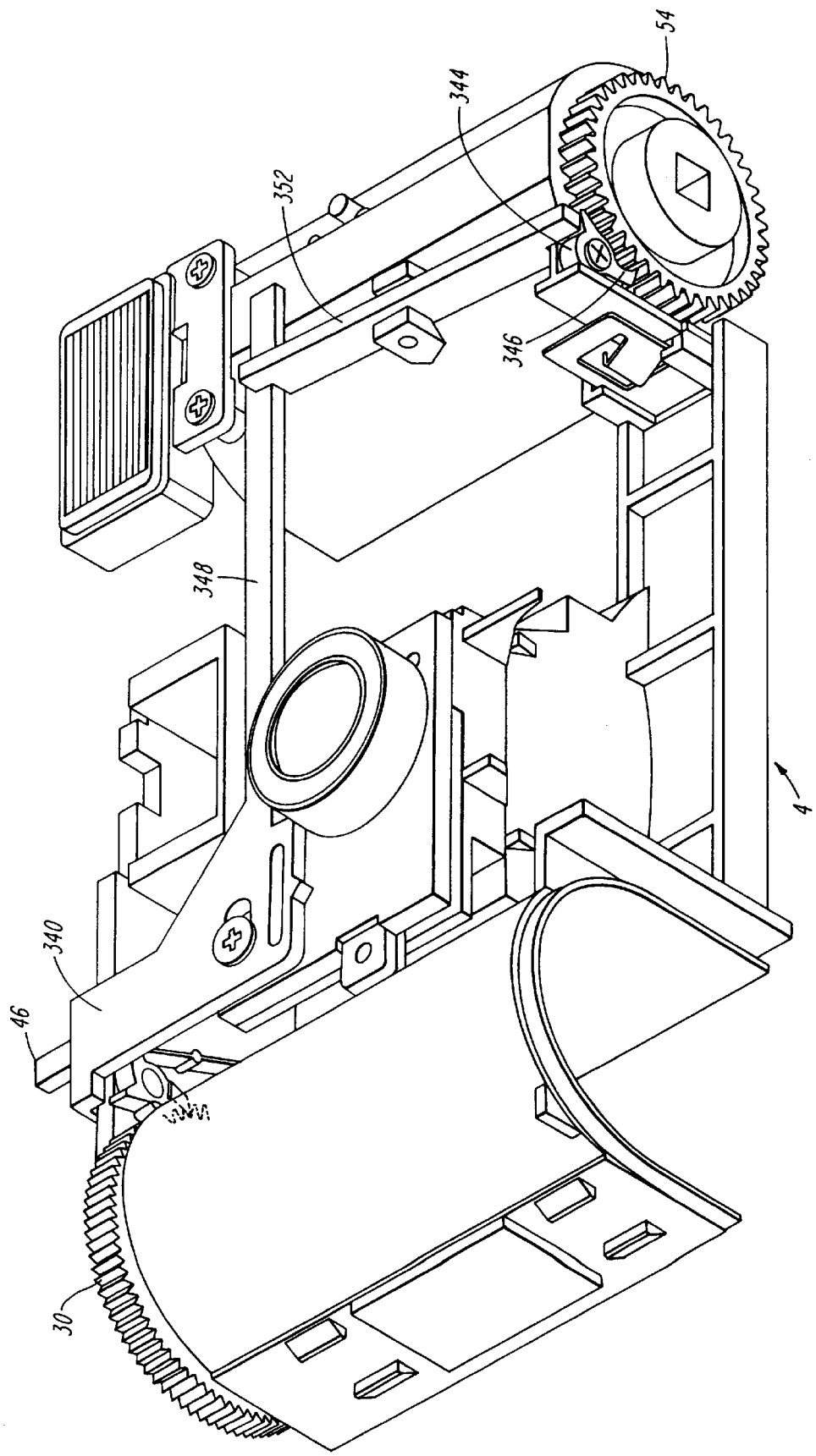
FIG. 9 is a front view corresponding to that of FIG. 8, in a film advance condition.

FIGS. 8 and 9 illustrate a third embodiment of the invention. The camera is identical to that of the first embodiment with the exception of the ratchet means for the film advance wheel and film pre-wind wheel. Here, instead of providing entirely separate ratchet means 40 for the film advance wheel 30 and ratchet means 58 for the film pre-wind wheel 54, the ratchet means are operatively linked together, and only a single knob for actuation by a user is provided. An identical pawl 36 is provided adjacent the film advance wheel 30, but instead of providing a slide, a sliding plate 340 is provided which has an edge 342 which engages a finger 41 of the pawl 36 and when the slide 340 is in its leftmost position (FIG. 8) the edge 342 pushes the pawl 36 so that the actuating finger 41 is withdrawn from the film advance wheel 30. This thereby allows the film advance wheel 30 to turn freely.

At the underside of the camera, as an alternative to the locking means 58 of the first embodiment, the film re-wind wheel 54 is instead provided with a second ratchet pawl 344 which is pivotably mounted and has an actuating finger 346 which engages the pre-wind wheel 54. The pawl 344 is biased by a springy arm thereof (not visible) or alternatively by a springy means to rotate in the anticlockwise sense (when viewed from below).

The slide 340 is operatively connected to the ratchet pawl 344 as follows. The slide 340 is formed with laterally extending rod 348 which is provided with ramp surface 350. A rocker arm 352 pivoted near its middle is arranged between the rod 348 and pawl 344 where it engages a second finger 354 of the pawl 344. The resilient arm of the pawl 344 which urges the pawl in the anticlockwise sense, also thereby urges the lower end of the rocker arm 352 outwardly. Thus, as the knob 46 and slide 340 is moved to the right ie away from the film advance wheel 30 the upper end of the rocker 352 is forced up the ramp 352, moving the lower end towards the pawl 344 and pre-wind wheel 54 and thereby causing the pawl 344 to rotate in a clockwise sense whereby the finger 346 is withdrawn from the wheel 54 allowing its free rotation and disengaging the ratchet effect. This is the position utilized during normal picture-taking so that the film can be sequentially withdrawn from the spool 16. As the knob 46 and slide 340 are moved towards the film advance wheel, the film advance ratchet is disengaged from the film advance wheel 30 allowing its free rotation, the resilient arm of pawl 344 urging the pawl to rotate in the anticlockwise sense thereby engaging the ratchet effect. This is the position for pre-winding the film from the cassette on to the spool 16.

Figure 10:
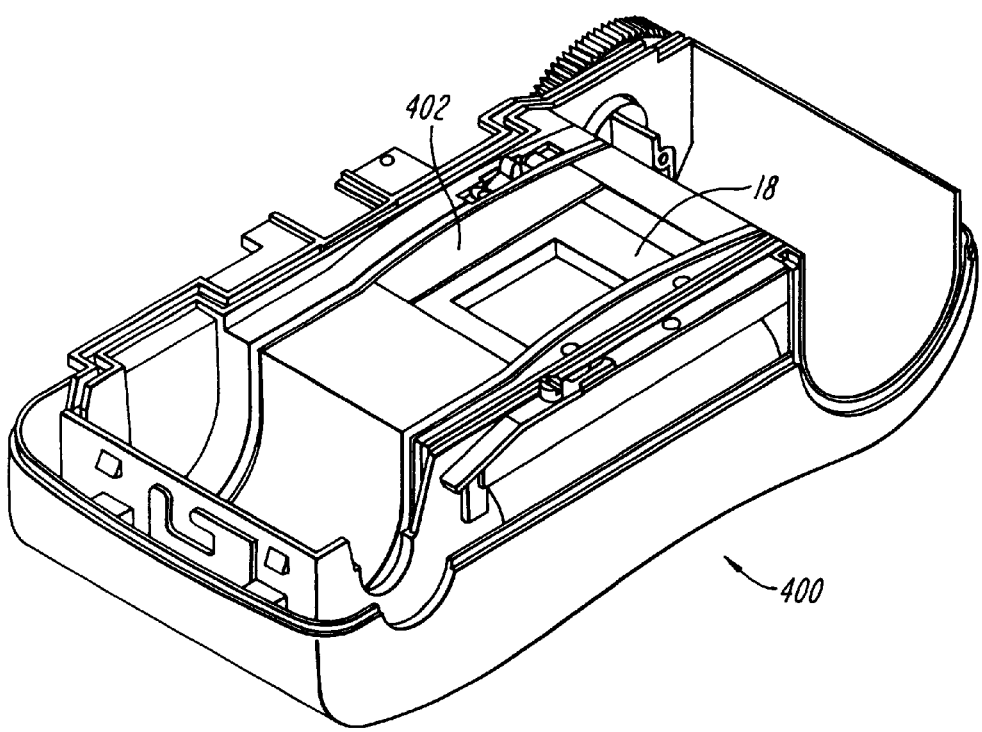
FIG. 10 is a rear view of fourth embodiment for use with film carrying part pre-exposed images.
Figure 13:
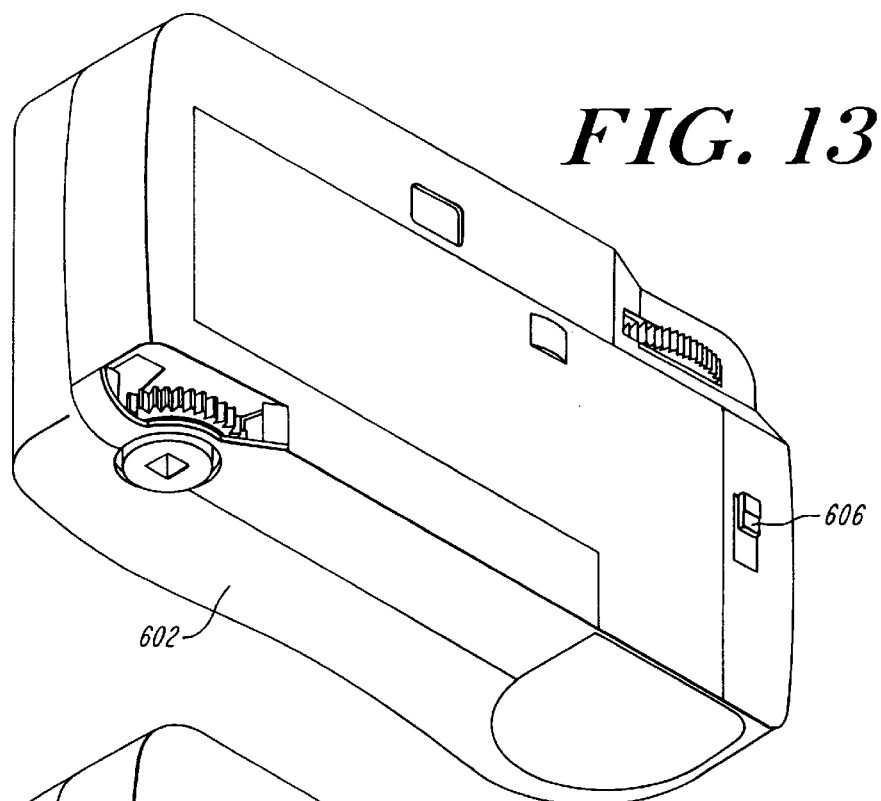
FIG. 13 is a rear view of sixth embodiment of the invention.
Figure 14:
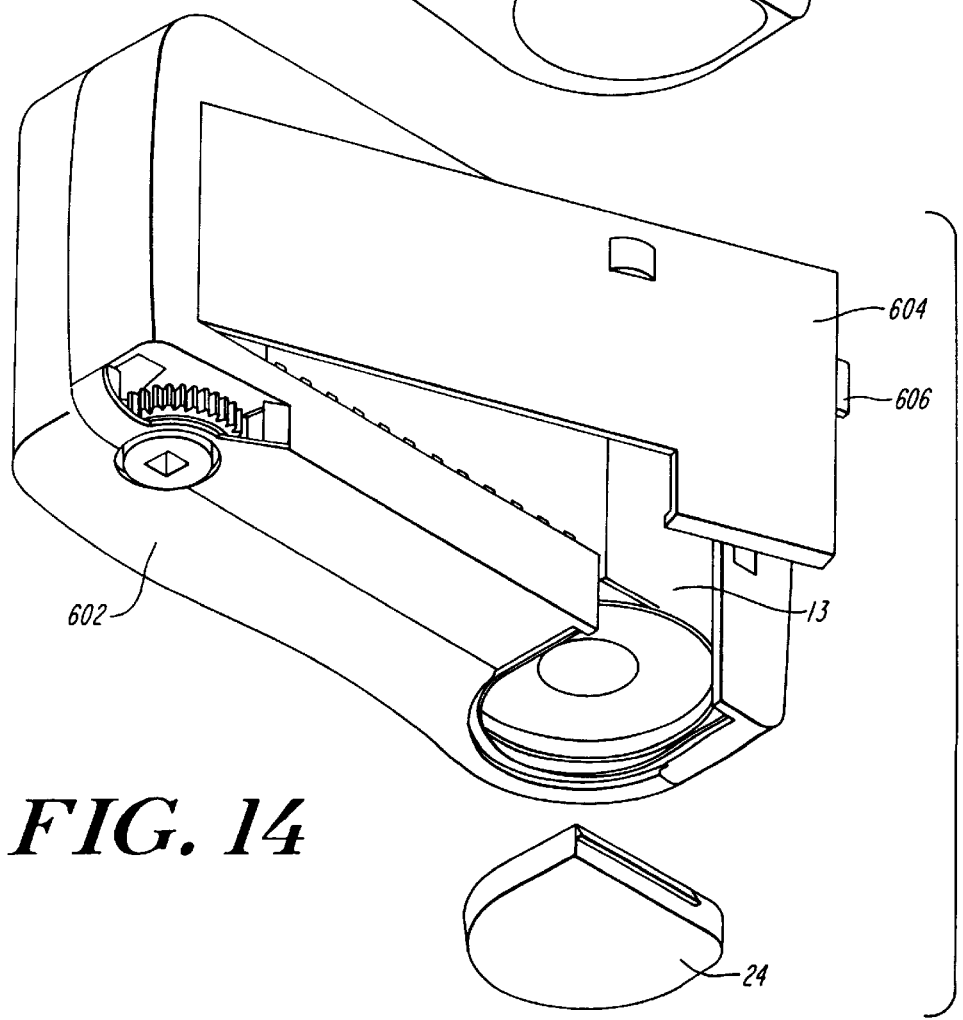
FIG. 14 is a rear view of the camera of FIG. 13 with a hinged rear cover in an open position.

In a fourth embodiment the camera 400 is used with partly pre-exposed film. Such film carries pre-exposed latent images bearing for example a message or caption or a decorative border. The camera is almost identical to that of either the first, second or third embodiments except that it requires means to block exposure of the portion of the film carrying the latent image. In FIG. 10 the camera includes a simple masking strip 402 along the upper edge of the exposure window which corresponds to the extent of the pre-exposed image in the form of a message-carrying border. A further difference from the camera of the first, second or third embodiments is that the camera includes alignment means in the form of a mark on the camera below the exposure window 18 with which an alignment mark on the film must be aligned, to ensure proper alignment of the pre-exposed images with the exposure window 18. Although a simple masking strip is shown other shapes of masks can be employed to correspond to other shapes of pre-exposed images.

The invention is equally applicable to a camera of the type as described in applicant's U.S. Pat. No. 5,790,906 which is hereby incorporated herein by reference where a movable mask is used to mask off a region of film carrying a pre-exposed latent image.

In a further adaptation shown in FIGS. 11 and 12, the camera is provided with a battery compartment 500 which is closed by a door 502 having a simple latch 504. Allowing access to the battery compartment through a simple door allows the user to easily change the battery 506 without having to disassemble the camera in any way.

In a sixth embodiment, the rear of the camera 602 includes a hinged back part 604 which has a simple latch arrangement 606 to releasably secure the hinged back part 604. This allows the user to readily open and close the camera for reloading purposes.

The camera may be constructed of components as are usually utilized in single-use cameras, except that here the camera is able to be readily re-used. The camera provides a simple yet effective means of allowing a user to pre-wind the film out of a conventional film cassette, and winding the film back into cassette sequentially as pictures are taken. The user can re-load the camera on their own thereby providing a cheap but effective re-usable camera.

What is claimed is:

1. A camera having a film-cassette chamber for receiving a film cassette having a spool therein on which film is wound and a film receiving chamber, the camera further comprising
   a film advance wheel including means for engaging the film cassette to allow film to be wound into the cassette;
   a rotatable spool disposed in said film receiving chamber to which a leading end of the film can be attached;
   a film pre-wind wheel connected to the spool, at least a portion of said pre-wind wheel being accessible externally of the camera by a user
   means for selectively ensuring unidirectional rotation of the film advance wheel during film advance after each exposure, said means being selectively disengageable to allow free rotation of the film advance wheel; and
   means for selectively engaging means on said rotatable film take-up spool to ensure unidirectional rotation of said spool during a film pre-wind operation.

2. A camera according to claim 1 wherein the means for selectively ensuring unidirectional rotation of the film advance wheel comprises a ratchet pawl selectively movable into engagement with the film advance wheel.

3. A camera according to claim 2 wherein the ratchet pawl is biased in a direction into engagement with said film advance wheel, and wherein movable actuating means are provided to disengage said ratchet pawl from said film advance wheel.

4. A camera according to claim 3 wherein said movable actuating means comprise a slidable arm which acts on a portion of said pawl to push it out of engagement with said film advance wheel.

5. A camera according to claim 4 wherein the slidable arm is provided with a portion thereof adapted to engage in one or other of a pair of detents which thereby define the engaged and disengaged positions of the slide arm and ratchet pawl.

6. A camera according to claim 1 wherein said means on said rotatable film take-up spool comprise said pre-wind wheel which is provided with a plurality of teeth, and the means to selectively engage said pre-wind wheel comprise a second ratchet means.

7. A camera according to claim 6 wherein the second ratchet means includes a springy slide arm movable into engagement with said pre-wind wheel to allow rotation of the wheel in one direction only.

8. A camera according to claim 7 wherein the springy slide arm is provided with a portion thereof adapted to engage in one or other of a pair of detents to thereby define the engaged and disengaged positions of the springy slide arm.

9. A camera according to claim 1 wherein the means for selectively engaging means on said rotatable take-up spool are operatively connected to said means for selectively ensuring unidirectional rotation of the film advance wheel.

10. A camera according to claim 9 wherein the means for selectively engaging means provided on said rotatable take-up spool comprise a second ratchet pawl.

11. A camera according to claim 10 wherein the means provided on the rotatable take-up spool comprise said pre-wind wheel which is provided with a plurality of teeth.

12. A camera according to claim 11 wherein the second ratchet pawl is biased by resilient means into engagement with said further wheel.

13. A camera according to claim 1 wherein the camera includes a removable rear cover which includes a latch to releasably secure the rear cover to the camera.

14. A camera according to claim 1 wherein the camera includes a rear hinged door openable by a user to allow filming reloading.

15. A camera according to claim 1 further comprising masking means for masking a portion of said exposure window.

16. A method of loading a film into a camera comprising a film cassette chamber and a film take-up spool housed in a film receiving chamber, a film advance wheel including means for engaging a spool of the film cassette to allow film to be wound into the cassette, a film pre-wind wheel connected to the film take-up spool at least a portion of which is accessible by a user, means for selectively ensuring unidirectional rotation of the film advance wheel, and means for selectively ensuring unidirectional rotation of the film take-up spool, the method involving the steps of:
   (a) inserting the film cassette into the cassette chamber and attaching a leading end of the film to the film take-up spool;
   (b) disengaging said means for selectively ensuring unidirectional rotation of the film advance wheel, and engaging the means for selectively ensuring unidirectional rotation of the film take-up spool; and
   (c) rotating said film pre-wind to unwind the film from said cassette on to said take-up spool.

17. A method according to claim 16 wherein the camera includes a removable rear cover, wherein the method includes the steps of:
   (c) removing the rear cover before step (a) and attaching the rear cover to close the camera before step (b).

18. A method according to claim 16 wherein the method involves, after step (c):
   (d) engaging said means for selectively ensuring unidirectional rotation of the film advance wheel, and disengaging said means for selectively ensuring unidirectional rotation of the film take-up spool.

* * * * *